United States Patent [19]

Lam et al.

[11] Patent Number: 5,005,176

[45] Date of Patent: Apr. 2, 1991

[54] METHOD AND APPARATUS FOR Q-SWITCHING A LASER

[75] Inventors: Juan F. Lam; Thomas C. Hasenberg, both of Agoura Hills, Calif.

[73] Assignee: Hughes Aircraft Company, Los Angeles, Calif.

[21] Appl. No.: 504,758

[22] Filed: Apr. 4, 1990

[51] Int. Cl.$^5$ .............................................. H01S 3/11
[52] U.S. Cl. .......................................... 372/10; 372/45
[58] Field of Search ....................... 372/44, 45, 46, 10

[56] References Cited

U.S. PATENT DOCUMENTS

| | | | |
|---|---|---|---|
| 4,055,815 | 10/1977 | Smith | 372/10 |
| 4,720,309 | 1/1988 | Deveaud et al. | 372/10 |
| 4,802,182 | 1/1989 | Thornton et al. | 372/45 |
| 4,860,296 | 8/1989 | Chemla et al. | 372/44 |
| 4,933,728 | 6/1990 | Fukuzawa et al. | 372/45 |
| 4,949,350 | 8/1990 | Jewell et al. | 372/45 |

OTHER PUBLICATIONS

Tien-Pei Lee, et al., "Repetitively Q-Switched Light Pulses from GaAs Injection Lasers with Tandem Double-Section Stripe Geometry", IEEE Journal of Quantum Electronics, vol. QE-6, No. 6, Jun. 1970, pp. 339-352.

D. Z. Tsang, et al., "Q Switching of Low-Threshold Buried-Heterostructure Diode Lasers at 10 GHz", Appl. Phys. Lett. 45(3), Aug. 1, 1984, pp. 204-206.

B. A. Wilson "Carrier Dynamics and Recombination Mechanisms in Staggered-Alignment Heterostructures", IEEE J. of Quantum Elec., vol. 24, No.8 Aug. 1988, pp. 1763-1777.

M.-H. Meynadier, et al., "Indirect-Direct Anticrossing in GaAs-AIAs Superlattices Induced by an Electric Field: Evidence of Γ-X Mixing", Phys. Review Lett., vol. 60, No. 13, Mar. 1988, pp. 1338-1341.

Y. Arakawa, et al., "Active Q Switching in a GaAs-/AlGaAs Multiquantum Well Laser with an Intracavity Monolithic Loss Modulator", Appl. Phys. Lett. 48(9) Mar. 3, 1986, pp. 561-563.

A. L. Robinson, "Multiple Quantum Wells for Optical Logic", Science, vol. 225, Aug. 1984, pp. 822-824.

*Primary Examiner*—Léon Scott, Jr.
*Attorney, Agent, or Firm*—Paul M. Coble; Wanda K. Denson-Low

[57] ABSTRACT

A type II staggered alignment multiple quantum well (MQW) is integrated into a laser cavity to implement an active Q-switched device. The MQW initially absorbs and stores energy to prevent the device from lasing. In response to an applied electric field, the MQW experiences a sudden charged carrier population inversion and emits a strong, short duration pulse having a directionality conincident with that of the beam within the lasing cavity. A generalization of the invention involves optical amplification in which photon energy is first stored in a type II staggered alignment MQW, followed by the simultaneous application of an electric field and an optical beam to the MQW, such that the stored energy is released in a sudden pulse which is amplified with respect to the applied optical beam, and is co-directional with the applied beam.

17 Claims, 5 Drawing Sheets

METHOD AND APPARATUS FOR Q-SWITCHING A LASER

BACKGROUND OF THE INVENTION

1. Field of the Invention

This invention relates to lasing methods and apparatus, and more particularly to Q-switched lasers in which energy is absorbed in the system to produce a high energy pulse.

2. Description of the Related Art

Single laser pulses of high peak power have been achieved by introducing into the laser cavity an irradiance-dependent or time-varying loss. If there is initially a high loss in the laser cavity, the gain from the inverted population can reach a very high value without laser oscillation beginning. Laser oscillation is prevented by the loss, while energy is pumped to the excited state of the active lasing medium. When a large population inversion is reached, the cavity losses are deliberately and suddenly reduced. The threshold gain decreases immediately, but the actual gain remains high because of the large excited-state population. The large difference between actual gain and threshold causes the laser radiation in the cavity to quickly grow, and all available energy is emitted in a single, large pulse. This pulse rapidly depopulates the excited state to such an extent that the gain is reduced below its threshold value, and lasing action ceases. This sudden altering of the losses of a laser cavity is known as Q-switching, because of the close relationship between resonator losses and resonator Q.

Passive Q-switching using saturable absorption in diode lasers was demonstrated by Lee and Roldan, "Repetitively Q-Switched Light Pulses From GaAs Injection Lasers with Random Double-Section Striped Geometry", *IEEE Journal of Quantum Electronics*, June, 1970, pages 339–352. Active Q-switching using electro-absorption by a buried heterostructure was described in an article by Tsang, et al., "Q-Switching of Low-Threshold BuriedHeterostructure Diode Lasers at 10 GHz", *Applied Physics Letters*, Vol. 45, No. 3, Aug. 1, 1984, pages 204–206. In both of these approaches the Q-switching acts as an energy drain to prevent lasing, and significantly lowers the efficiency of the laser.

Another active Q-switched laser is described in Arakawa, et al., "Active Q-switching In a GaAs/AlGaAs Multiquantum Well Laser with an Intracavity Monolithic Loss Modulator", *Applied Physics Letters*, Vol. 48, No. 9, Mar. 3, 1986, pages 561–563. A multiquantum well (MQW) laser was formed, consisting of an optical amplifier section and an electro-absorption loss modulator section. MQWs are periodic structures consisting of alternating ultrathin layers constructed of two semiconductors with different electrical and optical properties, but crystal structures with nearly identical lattice spacings; the matching lattices insure a continuous crystal with few defects. MQWs may be formed by molecular beam epitaxy, typically with layer thicknesses on the order of 100 Angstroms or more. A common semiconductor pair for this purpose is gallium arsenide and aluminum gallium arsenide. MQWs are described, for example, in Robinson, "Multiple Quantum Wells for Optical Logic", *Science*, Vol. 225, Aug. 24, 1984, pages 822–825.

In the Arakawa, et al. device, output pulses are periodically obtained by applying an electric field across the MQW structure. The parameters are selected such that a loss modulation is achieved through the quantum confined Stark effect in the modulator section, which together with a band-gap shrinkage that occurs in the amplifier section is said to result in extremely large loss changes. While pulses as narrow as 18.6 ps full width at half-maximum are said to be generated with a high repetition rate of more than 3 Ghz, this system is similar to the Lee and Tsang approaches in that the amplification of electro-absorption to MQW lasers results in a Q-switch that acts only as an energy drain, thereby significantly limiting the overall efficiency.

The operation of an MQW under the influence of an applied electric field E varies considerably, depending upon the particular MQW structure. MQWs have been categorized according to the relationship between the valance and conduction bands of their constituent semiconductors. The energy gap between the top of the valance band and the bottom of the conduction band is referred to as the band-gap. Type I MQWs are those in which the valance and conduction bands of the narrower gap material are nested within the band-gap of the other material; in other words, the narrower band-gap material has a lower conduction band but higher valance band than the other material. This combination is referred to as "nested alignment". Type I MQWs include heterostructures of the form $GaAs/Al_x Aa_{1-x}As$, in which x is less than 0.40. The MQW employed in the Arakawa, et al. Q-switched laser falls into this category.

In Type II MQWs, either the valance or conduction band of the narrower band-gap material, or both the valance and conduction bands, lie outside the band-gap of the other semiconductor. In staggered alignment Type II systems, either the valance or conduction band of the narrower gap material, but not both, lies outside the other material's band-gap; in misaligned Type II systems, both the valance and conduction bands of the narrower band-gap material lie outside the band-gap of the other material.

FIG. 1 is a simplified illustration of a MQW in cross-section, in which two semiconductors 2 and 4 with the required crystal near-match are alternated. The response of the MQW to an electric field E perpendicular to the layers is illustrated in FIGS. 2a and 2b, and is described in an article by Wilson, "Carrier Dynamics and Recombination Mechanisms in Staggered-Alignment Heterostructures," *IEEE Journal of Quantum Electronics*, Vol. 24, No. 8, August, 1988, pages 1763–1777. The band-gap structure is illustrated in FIG. 2a, in which C1, V1, C2 and V2 represent the conduction and valance bands of the first and second semiconductor materials, respectively. When the material is excited, as by the application of electromagnetic radiation, electrons are photoexcited from the higher valance band material (VI) into the conduction band for that material (C1), leaving a hole in V1. The charge carriers are trapped in the smaller band-gap material, and recombination occurs by the excited electron dropping in energy directly from C1 back to V1.

A staggered alignment Type II system is illustrated in FIG. 2b. In this system the valance band V1' of the larger band-gap material is at an energy level less than the valance band V2' of the narrower band-gap material, while the conduction band C1' for the wider band-gap material is also at an energy level less than the conduction band C2' of the narrower band-gap material. Thus, the lowest energy excited states for photoexcited electron and holes occur in opposite layers of the structure. As a result, excited electrons move laterally as a result of electron-lattice scattering from $C2'$ to the lower conduction band $c1'$, and thus become spatially separated from their recombination partners as indicated in FIG. 2b. The holes do not have an effective lateral movement because their effective mass is much greater than that of an electron. Subsequent recombination must take place across the interface between the two materials, which substantially reduces the recombination rate.

The application of an electric field perpendicular to the layers of a staggered alignment Type II MQW is illustrated in FIG. 3. The band structure becomes skewed, with the narrower band-gap material undergoing a red shift and the wider band-gap material a blue shift. With a sufficient applied field, the opposite motion of the energy shifts for the two conduction bands will cause the bands to align, or even reverse their relative positions. This induces a sudden retransfer of excited electron population back to the narrower band material, which in turn produces a strong population inversion and an optical emission burst as the excited electrons rapidly recombine with the holes in the valance band of the same material. As opposed to a recombination rate before the field is applied on the order of 1 microsecond - 1 msec, the electron retransfer rate with the field applied is much less than 1 psec.

As described in the literature, sharp pulses can be produced from staggered alignment Type II MQWs by first irradiating the structure so that it stores energy in the form of photoexcited electrons spatially separated from their recombination sites, and then applying an electric field to release the stored energy in a sudden burst, the wavelength of which is determined by the band-gap across which recombination occurs. This output is observed as a non-directional pulse extending essentially over 360°, as in Meynadier, et al., "Indirect-Direct Anticrossing in GaAs-AlAs Superlattices Induced by an Electric Field: Evidence of Γ-x Mixing", *The American Physical Society*, Vol. 60, No. 13, Mar. 28, 1988 (pages 1338–1341). The device in effect functions as an omni-directional light source, without the collimation coherence offered by a laser.

SUMMARY OF THE INVENTION

The present invention seeks to provide an improved method and apparatus for Q-switching a laser, and a generalized optical amplification method, which operates with a higher level of extraction efficiency than previously achieved, and is capable of producing high energy, short duration collimated pulse outputs with a controlled directionality.

In accordance with the invention, Q-switched lasing action is achieved by storing energy within a Type II staggered alignment MQW in the form of photoexcited electrons; an exciting laser gain medium is preferably used to induce this energy storage. When sufficient energy has been stored an electric field is applied across the MQW, causing a conduction band charge carrier population inversion which induces the MQW to emit a strong optical pulse. A beam is oscillated between the stimulated lasing medium and the MQW during the pulse generation with a wavelength approximately equal to the MQW emission, and give a directionality to the pulse emission.

The gain medium is preferably excited, and its beam is at least partially reflected back and forth between the gain medium and the MQW, both prior to and during at least a portion of the period that the electric field is applied. The beam is partially absorbed by the MQW during transit therethrough, producing the desired energy storage within the MQW. The MQW is configured to absorb sufficient energy from the beam to prevent lasing action until the electric field has been applied. The gain medium is selected so that the wavelength of its beam substantially matches both the molecular band-gap energy associated with the MQW population inversion and the wavelength of the gain medium, such that the wavelength of the optical pulse emitter by the MQW substantially matches that of the optical beam.

The invention may be generalized to an optical amplification method in which photon energy is stored in a Type II staggered alignment MQW by optically exciting the MQW with electromagnetic radiation, applying an electric field across the MQW of sufficient magnitude to induce a release of optical energy, and applying electromagnetic magnetic radiation as an input to the MQW concurrent with at least a portion of the energy release, such that the output is amplified with respect to said concurrent input. When the input comprises a directional beam, the energy release assumes the form of a similarly directional output beam pulse.

These and other features and advantages of the invention will be apparent to those skilled in the art from the following detailed description, taken together with the accompanying drawings, in which:

DETAILED DESCRIPTION OF THE INVENTION

Figure 4:
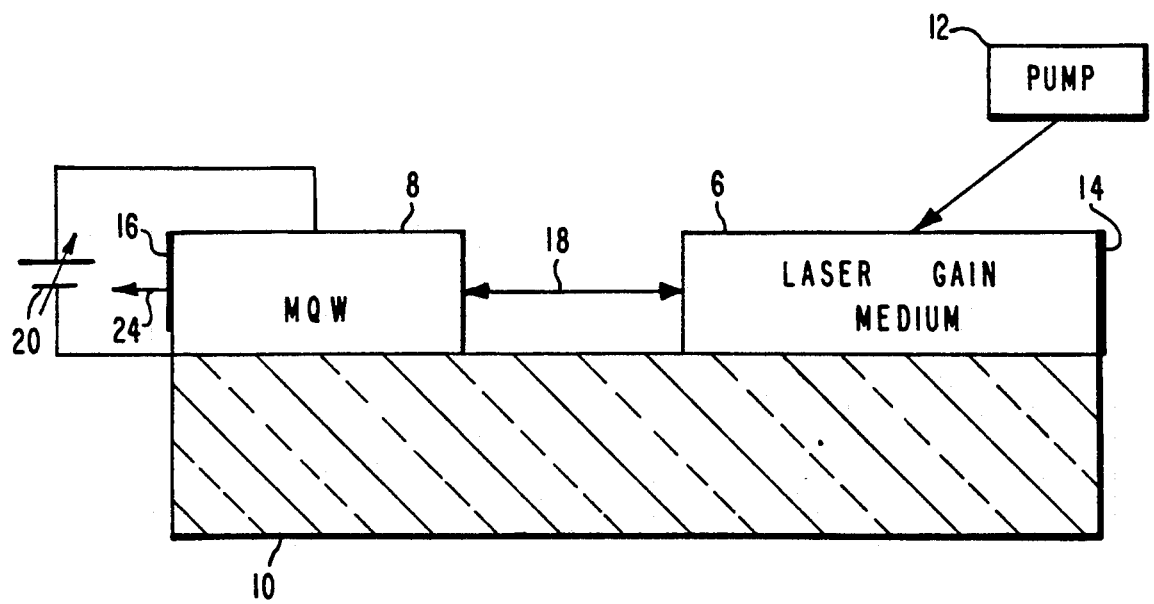
FIG. 4 is a simplified elevation view of a Q-switched laser employing the present invention.

A preferred implementation of the invention in the form of an integrated semiconductor device is illustrated in FIG. 4. However, the invention is not limited to semiconductor lasers and applies to other types of lasers, such as gas and crystal.

A laser gain medium 6 and a MQW 8 are spaced slightly apart from each other on a substrate 10. In the example shown, the gain medium 6 has a GaAs active region, sandwiched between AlGaAs cladding layers, the MQW consists of a GaAs/AlGaAs Type II staggered alignment device, and the substrate is formed from semi-insulating GaAs. A pump mechanism 12, which in the illustrated semiconductor embodiment consists of a conventional mechanism for introducing a high induction current into the gain medium 6, is provided to excite the gain medium. In the case of a gas laser a gas discharge would normally be used as the pumping mechanism, while a flash lamp could be employed to pump a crystal laser.

A highly reflective coating 14 is provided at the end of the gain medium away from the MQW, while a partially reflective coating 16 (preferably about 85% reflective) is provided at the end of the MQW away from the gain medium. The reflectors can consist of dielectric mirrors, reflective coatings on cleaved crystal faces, or polished ends of a crystal rod, depending upon the particular type of gain medium employed. The spacing between the opposed reflectors 14, 16 should be an integral multiple of half the desired operating wavelength. The overall laser cavity would normally be housed within an enclosure to keep out contaminants.

In operation, pump 12 is initially activated, exciting the gain medium 6 to emit electromagnetic radiation in the direction of MQW 8. At this point the pumping of gain medium 6 has not reached a level sufficient to produce a charge carrier population inversion in that medium, and accordingly full lasing action has not begun. Only a low level optical beam is emitted in the direction of MQW 8 (the term "optical" as used herein is not employed in a limiting sense as referring to visible light or any particular region of the electromagnetic spectrum, but rather refers generally to any radiation that a laser is capable of emitting).

Figure 1:
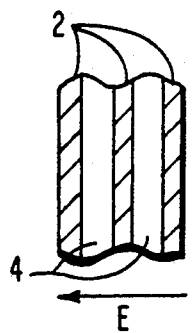
FIG. 1 is a simplified section view of a portion of a MQW.
Figure 2A:
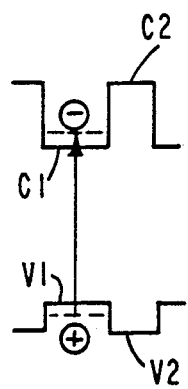
FIGS. 2a and 2b are simplified band diagrams discussed above, illustrating the excitation mechanism for nested alignment Type I and staggered alignment Type II MQWs, respectively.
Figure 2B:
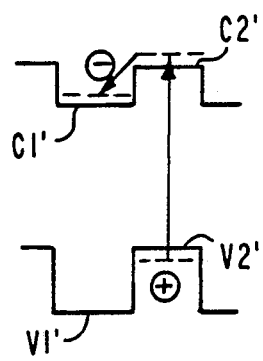

The MQW absorbs a portion of the incident beam from the gain medium as stored energy through the electron excitation and lattice scattering mechanism illustrated in FIG. 2b. Most of the remainder of the beam is redirected by reflector 16 back through the MQW into the gain medium. There it interacts with the gain medium, which continues to be pumped, and is reflected off reflector 14 back into the MQW. In this way an electromagnetic field in the form of beam 18 oscillates back and forth between the gain medium and the MQW. The energy absorbed by the MQW prevents the beam from building up to a level at which a charge carrier population inversion can occur within the gain medium. The majority of the absorbed energy is retained within the MQW in the form of stored energy because of the difficulty which excited electrons in the MQW have in recombining with their corresponding holes; this is a result of the spatial separation between the holes and electrons that was discussed above and illustrated in FIG. 2b.

Figure 3:
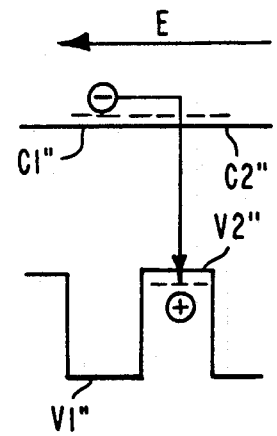
FIG. 3 is a simplified band diagram discussed above, illustrating the energy release mechanism when an electric field is applied across a staggered alignment Type II MQW.

After an initial period during which sufficient energy is stored in the MQW, an electric field is applied across the MQW by DC power supply 20. The electric field is perpendicular to the MQW layers, thus causing the lower conduction band to move up and the higher conduction band to move down until the barrier to excited electron-hole recombination has been removed, as illustrated in FIG. 3. At this point there is a pronounced retransfer of electron population laterally and down to the valance band for recombination. This leads to a strong optical emission from the MQW at the wavelength determined by the prevailing band-gap. In accordance with the invention, photons of approximately equal frequency are present within the MQW at the time of population retransfer from the laser gain medium. As a result, a strong stimulated emission process occurs, in which the output pulse 24 from the MQW assumes a directionality that is co-directional with the oscillating beam established between the MQW and gain medium.

In the illustrated embodiment, the use of GaAs in both the MQW and the gain medium assures that the frequency of the input beam is equal to that of the MQW-generated pulse. While different materials could also be used, they should have generally matching wavelengths.

The addition of a temporal electric field modulated Type II staggered alignment MQW structure in the laser cavity thus serves a dual purpose. First, the MQW provides a loss mechanism for Q-switching; the described MQW structure has an absorption coefficient of about $10^4 cm^{-1}$. Second, the absorbed energy is not lost, but rather is stored within the MQW to optimize the pulsed energy output.

Some practical considerations govern the type of MQW that can be used. The energy separation between the conduction bands of the two materials must be greater than about 25 meV for energy storage to take place. The time constant for recombination between the x-point in the conduction band and the $\Gamma$-point in the valance band must be greater than the modulation period. For a modulation rate greater than 10 GHz, the decay time must be longer than 0.1 nsec. The energy transfer time from the $\Gamma$-point in the conduction band to the x-point in the conduction band must be shorter than the spontaneous recombination time. For a GaAs/AlAs system, the spontaneous recombination time is 1 nsec, while the energy transfer time is about 100 fs at 6° K.; shorter times would be expected at room temperature. Finally, since the action of an applied electric field shifts the energy levels of the Type II MQW, the net shift must be embedded in the gain bandwidth of the amplifier. Recent experiments on GaAs/AlAs reported in the Meynadier et al. article reference above indicated a net shift of 100–200 meV.

Figure 5:
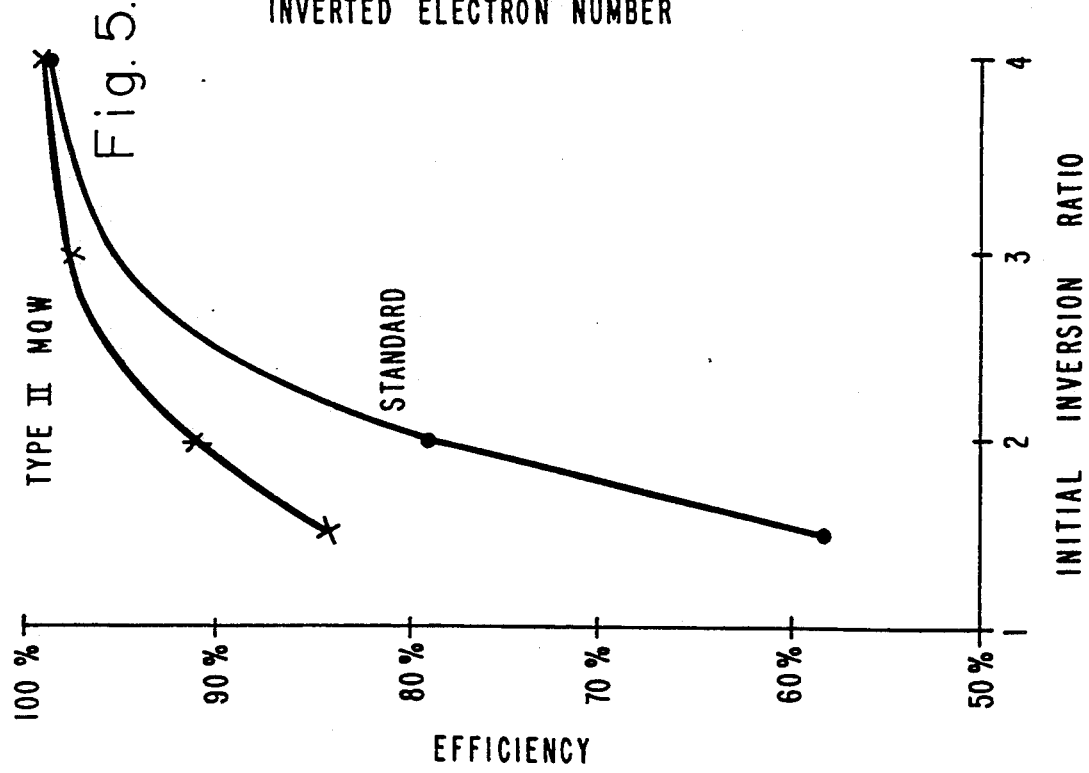

FIG. 5 is a graph comparing the calculated energy conversion efficiency for the device of FIG. 4 with that for a standard Q-switched laser, as a function of the initial inversion ratio. In this calculation it was assumed that $M/N_{th}=0.5$ and $\epsilon=1$, where M is the electron hole density in the MQW, $N_{th}$ is the threshold electron density in the laser gain medium, and $\epsilon$ is the ratio of the electron-hole pair coupling constant to photons over the electron-photon coupling constant. The Type II MQW Q-switch is found to be significantly more efficient than the standard Q-switched laser for small initial inversion ratios. This result implies that the current for Q-switching is lower in the Type II MQW device.

Figure 6:
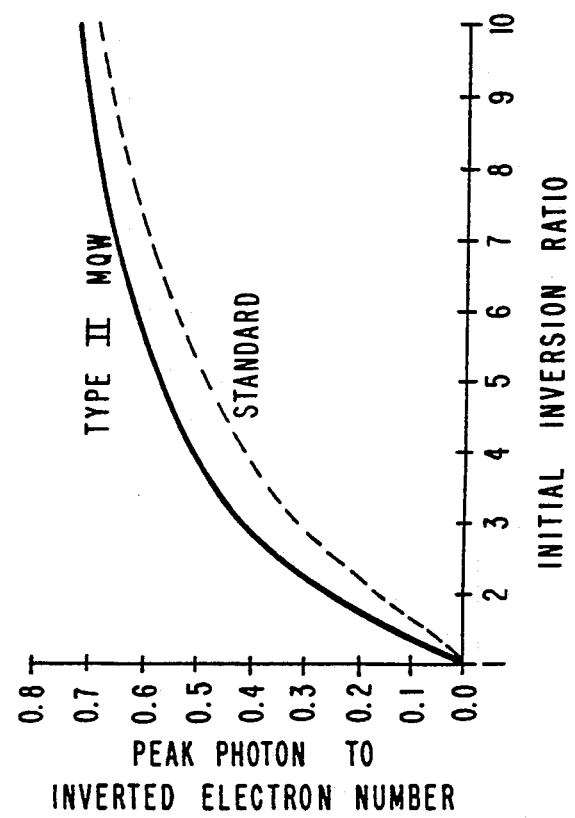
FIGS. 5, 6 and 7 are graphs showing the calculated operating characteristics of the Q-switched laser of FIG. 4.

FIG. 6 is another comparison plot, showing the calculated ratio of the photon number to the inverted electron number as a function of the initial inversion ratio, with the same assumptions for $M/N_{th}$ and $\epsilon$. The Type II MQW device predicted a better performance than the standard Q-switched system.

Figure 7:
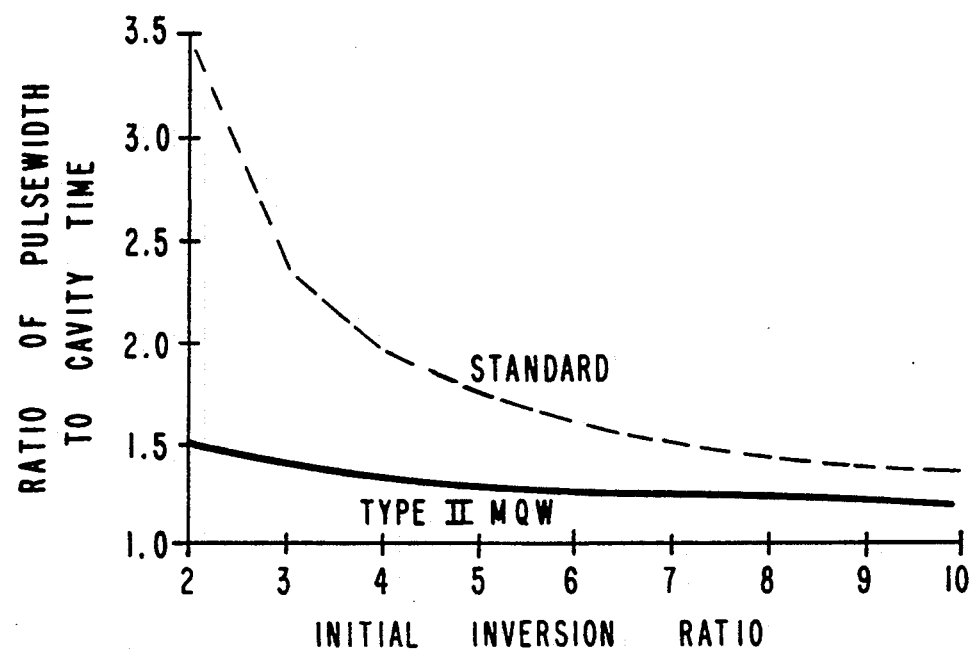

FIG. 7 is a comparison of the output pulse widths. The pulse width for the Type II MQW device is shown to be shorter than that obtained with the standard device.

Figure 8A:
FIGS. 8a–8i are simplified sectional views showing a sequential fabrication process for a Q-switched laser in accordance with the invention.
Figure 8B:
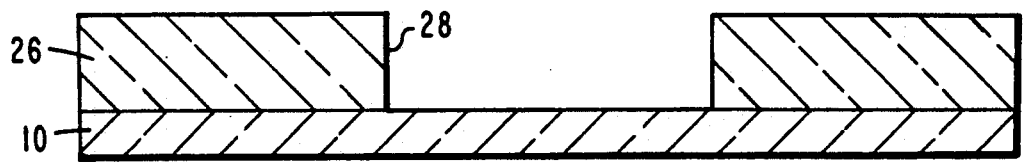
Figure 8C:
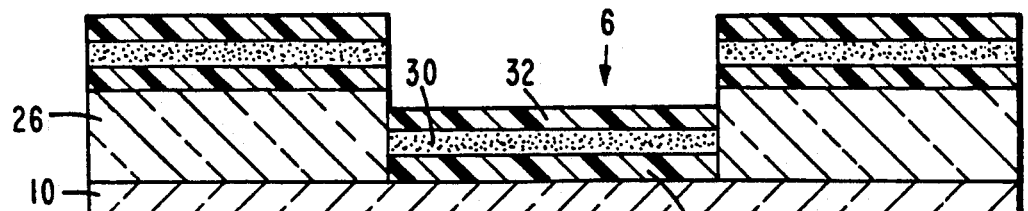

A preferred method of fabricating the new Q-switched laser is illustrated in FIGS. 8a–8i. Initially, a silicon dioxide mask 26 is deposited over substrate 10 (FIG. 8a). A window 28 is then opened in the silicon dioxide layer by standard photolithographic techniques (FIG. 8b), and the semiconductor laser gain medium 6 is grown over the substrate in the window area (FIG. 8c). In this implementation the inner laser layer 30 comprises a GaAs active region, while the surrounding layers 32 comprise AlGaAs cladding layers. The laser material is also grown on top of the silicon dioxide layer on either side of the window.

Figure 8D:
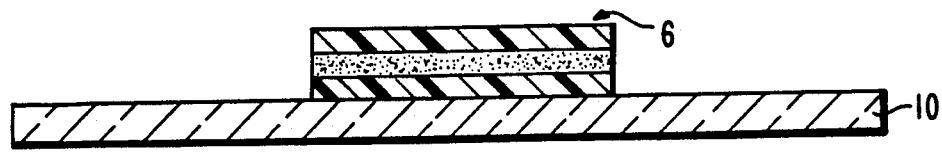
Figure 8E:
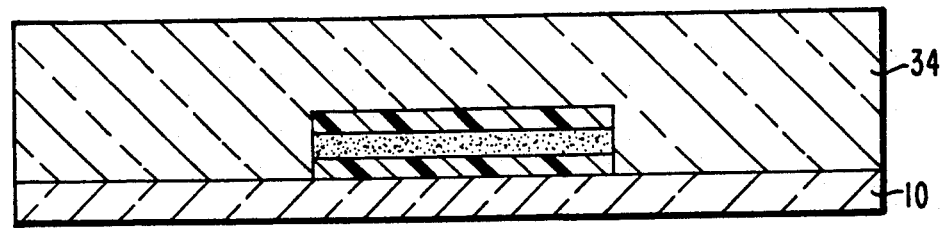
Figure 8F:
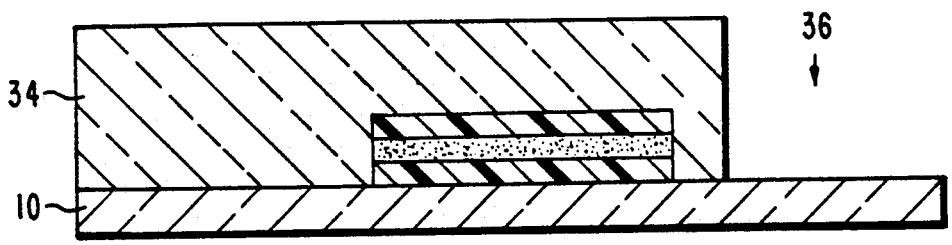

The oxide is next etched away, which also lifts off the unwanted laser growth which it carried, leaving only the single laser section 6 on substrate 10 (FIG. 8d). A new layer 34 of silicon dioxide is then deposited over the substrate and laser area (FIG. 8e), and a window 36 is opened in it for the deposition of a MQW (FIG. 8f).

Figure 8G:
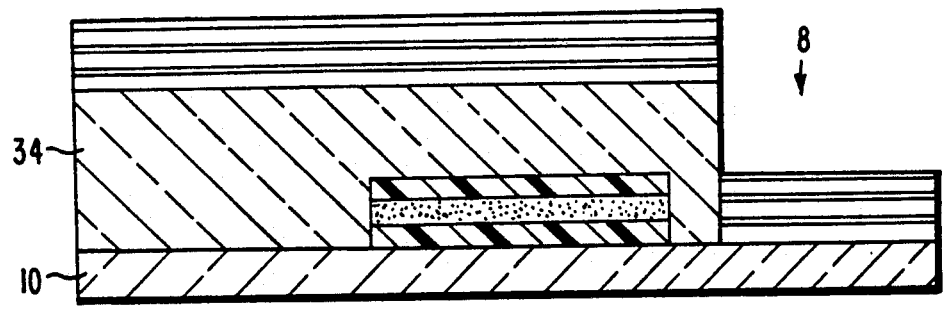
Figure 8H:
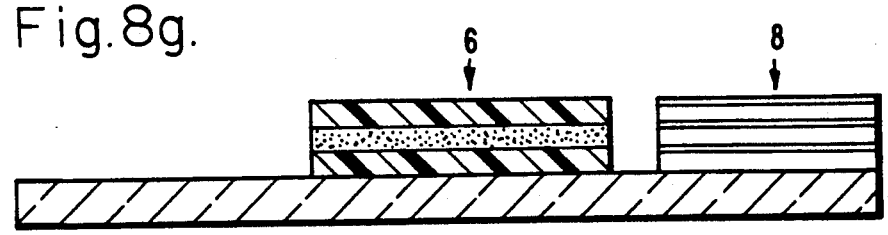
Figure 8I:
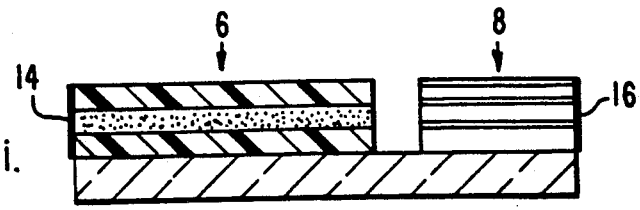

The Type II staggered alignment MQW 8, consisting in this embodiment of alternating layers of GaAs and AlGaAs, is grown using selective area epitaxy (FIG. 8g). The oxide 34 is then etched away, removing the unwanted MQW which it carried on top of it (FIG. 8h). Standard ohmic contacts (not shown) are then applied to the laser gain medium 6 for an injection current, and to the MQW 8 for the application of an electric field. Finally, the device is cleaved, a partially reflective coating 14 is deposited on the face of the MQW away from the laser, and a highly reflective coating 16 is deposited on the face of the laser away from the MQW.

Figure 9:
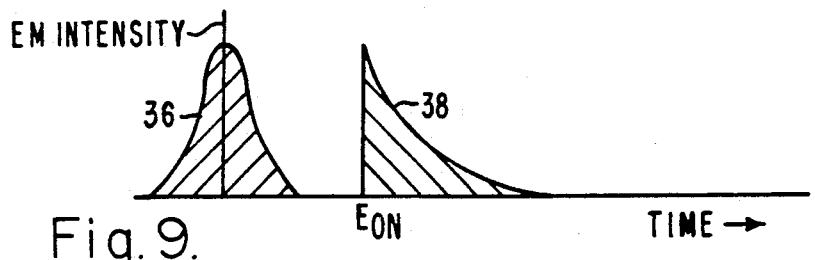
FIG. 9 is a graph illustrating a known method of producing an optical pulse from a MQW.

While the invention thus far has been described in terms of an active Q-switched laser, it may be generalized to encompass an optical amplification method that is not limited to laser applications. FIG. 9 illustrates the prior use of a Type II MQW to generate an optical pulse, as in the Meynadier article mentioned above. Initially, a pulse of electromagnetic radiation 36 is applied to the MQW and mostly stored therein in the form of photoexcited charge carriers. An electric field E is then applied across the MQW, resulting in an omnidirectional output optical pulse 38. Ignoring losses in the energy storage and release mechanisms, the total energies of the two pulses (the areas under the pulse curves) will be equal.

Figure 10:
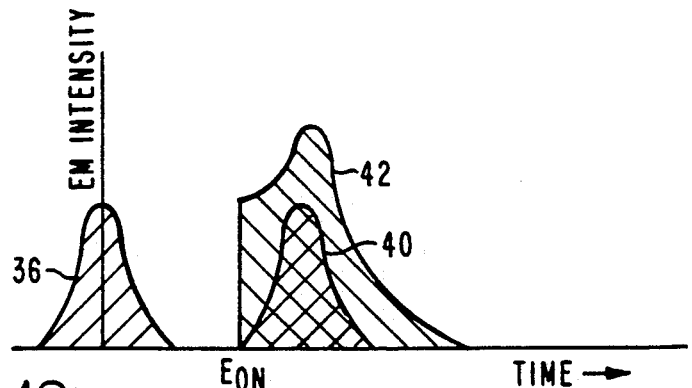
FIGS. 10–12 are graphs illustrating various ways of producing amplified directional outputs from a MQW in accordance with the invention.
Figure 11:
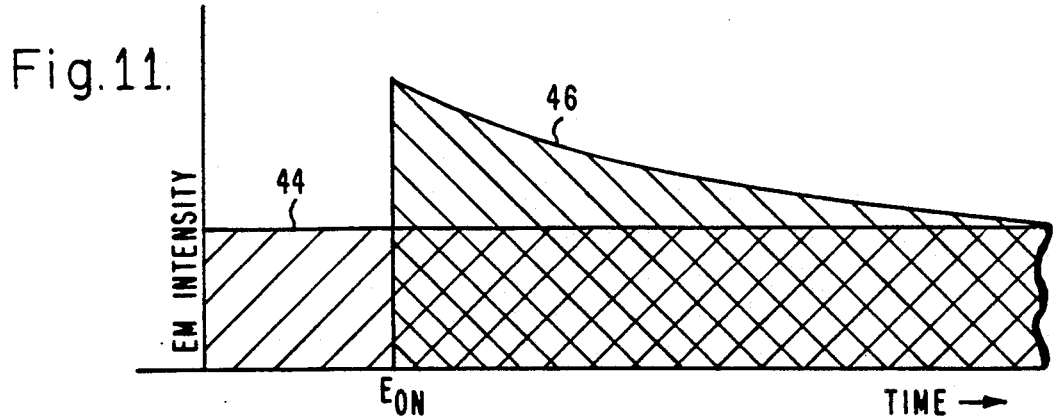
Figure 12:
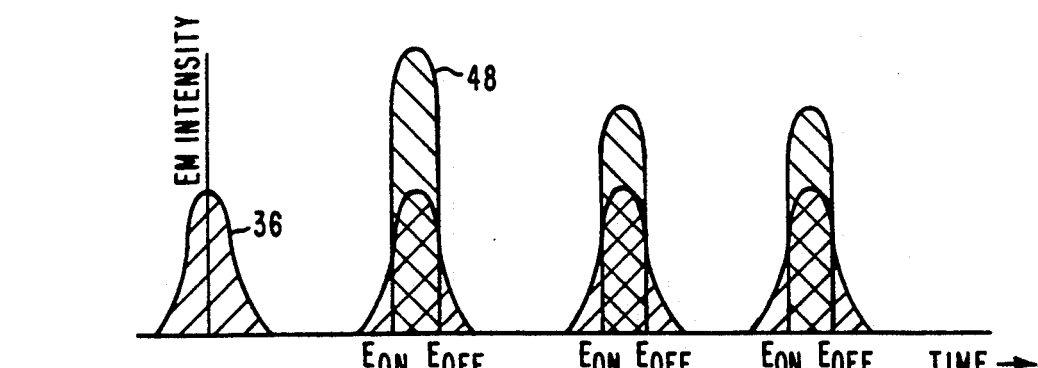

The situation with various embodiments of the present invention is illustrated in FIGS. 10-12. In FIG. 10 the MQW has been stimulated with an initial pulse 36, as before. However, a second input pulse 40 is applied to the MQW at the same time the electric field is turned on. The result is an output pulse 42 whose peak amplitude is amplified, and whose total energy area is equal to the sum of the areas under input pulses 36 and 40 (again ignoring losses). In addition, output pulse 42 will generally be collimated and with a directionality in the direction of the collimated input pulse 40.

FIG. 11 illustrates the situation when a continuous wave electromagnetic signal 44 is used to stimulate the MQW. The MQW stores energy from the continuous wave input until the electric field E is turned on. At that time an output pulse having the same directionality as the input signal is produced, and extends for a period that lasts as long as both the electric field and the continuous wave input are applied. The output, indicated by numeral 46 in FIG. 11, reaches an initial peak value determined by the amount of energy stored in the MQW up to the time the field is turned on, and then generally diminishes to the level of the continuous wave input.

FIG. 12 shows the results of a pulsed input, with the electric field turned on and off within the limits of each input pulse. One or more initial input pulses 36 store energy in the MQW. When the electric field is turned on during a subsequent pulse, an output pulse 48 is produced which reaches a peak value determined by the amount of energy stored in the device. The electric field is cycled on and off during each subsequent input pulse, producing an output pulse each time. The intensities of the subsequent output pulses are determined by the amount of residual energy stored in the MQW from previous pulses, and the energy added to the MQW by the coincident input pulse. The field can be cycled on and off, as illustrated in FIG. 12, so that the intensity of each output pulse is amplified with respect to the intensity of the concurrent input pulse. As with the other embodiments, the output pulses will have a directionality determined by their concurrent input pulses.

The Q-switched laser embodiment of the invention has been shown to have high extraction efficiency, a large ratio of peak photon to inverted electron densities, and shorter output pulse widths. Modulation rates have ranged from 3 GHz to 10 GHz, with demonstrated threshold currents as low as 14 mA. The new Q-switched laser uses an MQW to absorb and store energy from the gain medium, and return the energy to the optical cavity in the presence of a temporally modulated applied electric field, leading in essence to an additional inverted element whose effect is to reduce the threshold current for Q-switching.

While several illustrative embodiments of the invention have been described, numerous variations and alternate embodiments will occur to those skilled in the art. Such variations and alternate embodiments are contemplated, and can be made without departing from the spirit and scope of the invention as defined in the appended claims.

We claim:

1. An optical amplification method, comprising:
    storing photon energy in a Type II staggered alignment multiple quantum well (MQW) structure by optically exciting the MQW structure with electromagnetic radiation,
    applying an electric field across the MQW structure of sufficient magnitude to induce a release of optical energy from the structure, and
    applying electromagnetic radiation at a wavelength substantially matched with that of the MQW energy release as an input to the MQW structure during at least a portion of said energy release, such that said energy release is amplified with respect to said input.

2. The optical amplification method of claim 1, wherein said electromagnetic radiation input comprises a directional beam, whereby said energy release assumes the form of a similarly directional beam pulse.

3. The optical amplification method of claim 1, wherein a series of electromagnetic radiation pulses are applied to said MQW structure, at least one of the initial pulses of said series comprise excitation pulses used to optically excite the MQW structure, and the electric field is applied to the MQW structure approximately only during the periods that the pulses subsequent to said excitation pulses are applied to the structure.

4. The optical amplification method of claim 1, wherein a continuous wave electromagnetic radiation input is applied to said structure, and said electric field is applied across the structure after an initial portion of said continuous wave during which energy is stored in the structure from the applied radiation during said initial portion.

5. A Q-switching lasing method, comprising:
    storing energy within a Type II staggered alignment multiple quantum well (MQW) by exciting electrons from one MQW material into the conduction band of another MQW material, applying an electric field across the MQW to cause a conduction band charge carrier population inversion in said one MQW material, exciting a laser gain medium to transmit an optical beam into said MQW during at least a portion of the application of said electron field, said beam having a wavelength which substantially matches the wavelength associated with the population inversion in the MQW material, and at least partially reflecting said beam back and forth between said gain medium and said MQW, said population inversion stimulating an optical emission from said MQW which has a directionality determined by said optical beam.

6. The method of claim 5, wherein said gain medium is excited and said beam is at least partially reflected back and forth between said gain medium and said MQW both prior to and during at least a portion of the application of said electric field, said beam being partially absorbed by the MQW during transit therethrough and thereby serving to store energy within said MQW.

7. The method of claim 5, wherein the wavelength of said optical beam substantially matches the molecular band-gap energy associated with said population inversion, such that the wavelength of the optical emission from said MQW substantially matches that of said optical beam.

8. A Q-switching lasing method, comprising:

stimulating a laser gain medium to emit a radiation beam into a Type II staggered alignment multiple quantum well (MQW), at least partially reflecting said beam back and forth through said gain medium and MQW, said MQW absorbing a portion of the beam radiation during each pass and storing energy from the absorbed radiation in the form of photoexcited electrons, with the photoexcited electrons laterally separated from their corresponding holes, applying an electric field across the MQW of sufficient intensity to produce a charge carrier population inversion and release of an optical energy pulse from said MQW, said laser gain medium being selected so that the wavelength of said beam substantially matches the wavelength of said MQW pulse, and continuing to stimulate said gain medium to emit said beam into the MQW during the release of said pulse from said MQW, thereby providing said pulse with a directionality determined by said beam.

9. The method of claim 8, wherein said gain medium is stimulated to emit a substantially continuous wave beam prior to and during the emission of said pulse from the MQW.

10. The method of claim 8, wherein said gain medium is stimulated to emit a pulsed beam.

11. The method of claim 8, said MQW being configured to absorb sufficient energy from said beam to prevent lasing action until said electric field is applied.

12. The method of claim 11, said gain material establishing the wavelength of the beam, said MQW being selected to have an emission band-gap energy which generally matches said wavelength.

13. The method of claim 8, wherein reflectors are provided at opposite ends of the gain medium and MQW to reflect said beam back and forth, at least one of said reflectors being partially reflective.

14. A Q-switched laser, comprising:

a laser gain medium, means for exciting the gain medium to emit a beam, a Type II staggered alignment multiple quantum well (MQW) structure in the path of said beam, said MQW absorbing at least a portion of said beam and storing absorbed energy as photoexcited charge carriers, and means for applying an electric field across said MQW to induce therein a conduction band charge carrier population inversion which causes said MQW to emit an optical pulse, said laser gain medium being selected so that the wavelength of said beam substantially matches the wavelength of said MQW pulse.

15. The Q-switched laser of claim 14, said MQW being configured to absorb sufficient energy from said beam to prevent lasing action until said electric field is applied.

16. The Q-switched laser of claim 15, said gain material establishing the wavelength of the beam, said MQW being selected to have an emission band-gap energy which generally matches said wavelength.

17. The Q-switched laser of claim 15, further comprising reflectors at opposite ends of the gain medium and MQW to reflect said beam back and forth, at least one of said reflectors being partially reflective.

* * * * *

UNITED STATES PATENT AND TRADEMARK OFFICE
CERTIFICATE OF CORRECTION

PATENT NO. : 5,005,176
DATED : April 2, 1991
INVENTOR(S) : JUAN F. LAM, et al.

It is certified that error appears in the above-identified patent and that said Letters Patent is hereby corrected as shown below:

Item [57] Abstract; line 8, delete "conincident"
and insert --coincident--.

Signed and Sealed this

Fifth Day of October, 1993

Attest:

BRUCE LEHMAN

Attesting Officer  Commissioner of Patents and Trademarks